(12) United States Patent
Ishikawa

(10) Patent No.: US 7,660,012 B2
(45) Date of Patent: Feb. 9, 2010

(54) GRADATION IMAGE FORMING APPARATUS AND GRADATION IMAGE FORMING METHOD

(75) Inventor: Takashi Ishikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 860 days.

(21) Appl. No.: 11/018,462

(22) Filed: Dec. 21, 2004

(65) Prior Publication Data
US 2005/0141062 A1    Jun. 30, 2005

(30) Foreign Application Priority Data
Dec. 24, 2003    (JP)    ............... 2003-427414

(51) Int. Cl.
G03F 3/08    (2006.01)
G06F 15/00    (2006.01)

(52) U.S. Cl. ....................... 358/1.9; 358/521

(58) Field of Classification Search ............... 358/1.9, 358/3.23, 518–522; 382/162, 166, 164, 165, 382/173
See application file for complete search history.

(56) References Cited

U.S. PATENT DOCUMENTS

| | | | | |
|---|---|---|---|---|
| 5,122,872 A | * | 6/1992 | Nagano | ........................ 358/524 |
| 5,666,436 A | * | 9/1997 | Eames | ........................ 382/167 |
| 5,754,698 A | * | 5/1998 | Suzuki et al. | ................ 382/232 |
| 5,903,360 A | * | 5/1999 | Honma et al. | ................ 358/450 |
| 6,990,235 B2 | * | 1/2006 | Katsuyama | .................. 382/165 |
| 2004/0165773 A1 | * | 8/2004 | Katsuyama | .................. 382/173 |

FOREIGN PATENT DOCUMENTS

| | | |
|---|---|---|
| JP | 05-328142 | 12/1993 |
| JP | 08-305822 | 11/1996 |
| JP | 09-259258 | * 10/1997 |
| JP | 9-259258 | 10/1997 |
| JP | 10-49121 | 2/1998 |
| JP | 2000-261803 | 9/2000 |
| JP | 2003-223644 | 8/2003 |
| JP | 2003-348359 | 12/2003 |

OTHER PUBLICATIONS

Notification of Reasons for Rejection for Japanese Patent Application No. 2003-427414, mailed Mar. 10, 2009 (4 pgs.) with translation (4 pgs.).

* cited by examiner

Primary Examiner—Kimberly A Williams
(74) Attorney, Agent, or Firm—Straub and Pokotylo; John C. Pokotylo (57) ABSTRACT

A gradation image forming apparatus comprises a gradation data generation section. The gradation data generation section generates gradation data in each pixel of a gradation image based on at least one table of a reference color number corresponding to a pixel value of a reference color which is a start color of the gradation image, at least one table of a difference number corresponding to a difference in pixel values between adjacent pixels in the gradation image, and a pixel value of each pixel of the gradation image.

11 Claims, 12 Drawing Sheets

FIG. 1

| Reference color No. | Difference No. |

| Difference No. | 0 | 1 |
|---|---|---|
| Difference value | 0 | 1 |

FIG. 5

| Difference No. | 0 | 1 | 2 | 3 | 4 | 5 | 6 |
|---|---|---|---|---|---|---|---|
| Difference value | 0 | 1 | 2 | 3 | 4 | 5 | -1 |

FIG. 6

| Reference color No. | 0 | 1 | 2 |
|---|---|---|---|
| Pixel value | 0 | 122 | 255 |

| | 1 | 2 | 3 | ......... | | | | | | | | | | | m |
|---|---|---|---|---|---|---|---|---|---|---|---|---|---|---|---|
| 1 | 240 | 220 | 200 | 180 | 160 | 140 | 120 | 100 | 80 | 60 | 40 | 20 | 0 | 0 | 0 |
| 2 | 240 | 220 | 200 | 180 | 160 | 140 | 120 | 100 | 80 | 60 | 40 | 20 | 0 | 0 | 0 |
| 3 | 240 | 220 | 200 | 180 | 160 | 140 | 120 | 100 | 80 | 60 | 40 | 20 | 0 | 0 | 0 |
| ⋮ | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| | 240 | 220 | 200 | 180 | 160 | 140 | 120 | 100 | 80 | 60 | 40 | 20 | 0 | 0 | 0 |
| n | 240 | 220 | 200 | 180 | 160 | 140 | 120 | 100 | 80 | 60 | 40 | 20 | 0 | 0 | 0 |

Image data ⎯⎯⎯⎯⎯⎯→ Scanning direction

| Difference No. | 0 | 1 |
|---|---|---|
| Difference value | 0 | −20 |

FIG. 10B

| Reference color No. | 0 |
|---|---|
| Reference color pixel value | 240 |

| | | | | | | | | | | | | | | | Reference color No. + difference No. |
|---|---|---|---|---|---|---|---|---|---|---|---|---|---|---|---|
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+1 | 0+1 | 0+0 | 0+0 |

Gradation data ⎯⎯⎯⎯⎯⎯⎯⎯▷ Scanning direction

| 240 | 240 | 240 | 240 | 240 | 240 | 240 | 240 | 240 | 240 | 240 | 240 | 240 | 240 | 240 | 240 |
|-----|-----|-----|-----|-----|-----|-----|-----|-----|-----|-----|-----|-----|-----|-----|-----|
| 240 | 240 | 240 | 240 | 240 | 240 | 240 | 240 | 240 | 240 | 240 | 240 | 240 | 240 | 240 | 220 |
| 240 | 240 | 240 | 240 | 240 | 240 | 240 | 240 | 240 | 240 | 240 | 240 | 240 | 240 | 220 | 200 |
| 240 | 240 | 240 | 240 | 240 | 240 | 240 | 240 | 240 | 240 | 240 | 240 | 240 | 220 | 200 | 180 |
| 240 | 240 | 240 | 240 | 240 | 240 | 240 | 240 | 240 | 240 | 240 | 240 | 220 | 200 | 180 | 160 |
| 240 | 240 | 240 | 240 | 240 | 240 | 240 | 240 | 240 | 240 | 240 | 220 | 200 | 180 | 160 | 140 |
| 240 | 240 | 240 | 240 | 240 | 240 | 240 | 240 | 240 | 240 | 220 | 200 | 180 | 160 | 140 | 120 |
| 240 | 240 | 240 | 240 | 240 | 240 | 240 | 240 | 240 | 220 | 200 | 180 | 160 | 140 | 120 | 100 |
| 240 | 240 | 240 | 240 | 240 | 240 | 240 | 240 | 220 | 200 | 180 | 160 | 140 | 120 | 100 | 80 |
| 240 | 240 | 240 | 240 | 240 | 240 | 240 | 220 | 200 | 180 | 160 | 140 | 120 | 100 | 80 | 60 |
| 240 | 240 | 240 | 240 | 240 | 240 | 220 | 200 | 180 | 160 | 160 | 120 | 100 | 80 | 60 | 40 |
| 240 | 240 | 240 | 240 | 240 | 220 | 200 | 180 | 160 | 140 | 120 | 100 | 80 | 60 | 40 | 20 |
| 240 | 240 | 240 | 240 | 220 | 200 | 180 | 160 | 140 | 120 | 100 | 80 | 60 | 40 | 20 | 0 |
| 240 | 240 | 240 | 220 | 200 | 180 | 160 | 140 | 120 | 100 | 80 | 60 | 40 | 20 | 0 | 0 |
| 240 | 240 | 220 | 200 | 180 | 160 | 140 | 120 | 100 | 80 | 60 | 40 | 20 | 0 | 0 | 0 |
| 240 | 220 | 200 | 180 | 160 | 140 | 120 | 100 | 80 | 60 | 40 | 20 | 0 | 0 | 0 | 0 |

FIG. 13B        Image data ⟶ Scanning direction

| 0+0 | 0+0 | 0+0 | 0+0 | 0+0 | 0+0 | 0+0 | 0+0 | 0+0 | 0+0 | 0+0 | 0+0 | 0+0 | 0+0 | 0+0 | 0+0 |
|-----|-----|-----|-----|-----|-----|-----|-----|-----|-----|-----|-----|-----|-----|-----|-----|
| 0+0 | 0+0 | 0+0 | 0+0 | 0+0 | 0+0 | 0+0 | 0+0 | 0+0 | 0+0 | 0+0 | 0+0 | 0+0 | 0+0 | 0+0 | 0+1 |
| 0+0 | 0+0 | 0+0 | 0+0 | 0+0 | 0+0 | 0+0 | 0+0 | 0+0 | 0+0 | 0+0 | 0+0 | 0+0 | 0+0 | 0+1 | 0+1 |
| 0+0 | 0+0 | 0+0 | 0+0 | 0+0 | 0+0 | 0+0 | 0+0 | 0+0 | 0+0 | 0+0 | 0+0 | 0+0 | 0+1 | 0+1 | 0+1 |
| 0+0 | 0+0 | 0+0 | 0+0 | 0+0 | 0+0 | 0+0 | 0+0 | 0+0 | 0+0 | 0+0 | 0+0 | 0+1 | 0+1 | 0+1 | 0+1 |
| 0+0 | 0+0 | 0+0 | 0+0 | 0+0 | 0+0 | 0+0 | 0+0 | 0+0 | 0+0 | 0+0 | 0+1 | 0+1 | 0+1 | 0+1 | 0+1 |
| 0+0 | 0+0 | 0+0 | 0+0 | 0+0 | 0+0 | 0+0 | 0+0 | 0+0 | 0+0 | 0+1 | 0+1 | 0+1 | 0+1 | 0+1 | 0+1 |
| 0+0 | 0+0 | 0+0 | 0+0 | 0+0 | 0+0 | 0+0 | 0+0 | 0+0 | 0+1 | 0+1 | 0+1 | 0+1 | 0+1 | 0+1 | 0+1 |
| 0+0 | 0+0 | 0+0 | 0+0 | 0+0 | 0+0 | 0+0 | 0+0 | 0+1 | 0+1 | 0+1 | 0+1 | 0+1 | 0+1 | 0+1 | 0+1 |
| 0+0 | 0+0 | 0+0 | 0+0 | 0+0 | 0+0 | 0+0 | 0+1 | 0+1 | 0+1 | 0+1 | 0+1 | 0+1 | 0+1 | 0+1 | 0+1 |
| 0+0 | 0+0 | 0+0 | 0+0 | 0+0 | 0+0 | 0+1 | 0+1 | 0+1 | 0+1 | 0+1 | 0+1 | 0+1 | 0+1 | 0+1 | 0+1 |
| 0+0 | 0+0 | 0+0 | 0+0 | 0+0 | 0+1 | 0+1 | 0+1 | 0+1 | 0+1 | 0+1 | 0+1 | 0+1 | 0+1 | 0+1 | 0+1 |
| 0+0 | 0+0 | 0+0 | 0+0 | 0+1 | 0+1 | 0+1 | 0+1 | 0+1 | 0+1 | 0+1 | 0+1 | 0+1 | 0+1 | 0+1 | 0+0 |
| 0+0 | 0+0 | 0+0 | 0+1 | 0+1 | 0+1 | 0+1 | 0+1 | 0+1 | 0+1 | 0+1 | 0+1 | 0+1 | 0+1 | 0+0 | 0+0 |
| 0+0 | 0+0 | 0+1 | 0+1 | 0+1 | 0+1 | 0+1 | 0+1 | 0+1 | 0+1 | 0+1 | 0+1 | 0+1 | 0+0 | 0+0 | 0+0 |
| 0+0 | 0+1 | 0+1 | 0+1 | 0+1 | 0+1 | 0+1 | 0+1 | 0+1 | 0+1 | 0+1 | 0+1 | 0+0 | 0+0 | 0+0 | 0+0 |

FIG. 13C        Gradation ⟶ Scanning direction

| 240 | 240 | 240 | 240 | 240 | 240 | 240 | 240 | 240 | 240 | 240 | 240 | 240 | 240 | 240 | 240 |
|---|---|---|---|---|---|---|---|---|---|---|---|---|---|---|---|
| 220 | 220 | 220 | 220 | 220 | 220 | 220 | 220 | 220 | 220 | 220 | 220 | 220 | 220 | 220 | 220 |
| 200 | 200 | 200 | 200 | 200 | 200 | 200 | 200 | 200 | 200 | 200 | 200 | 200 | 200 | 200 | 200 |
| 180 | 180 | 180 | 180 | 180 | 180 | 180 | 180 | 180 | 180 | 180 | 180 | 180 | 180 | 180 | 180 |
| 160 | 160 | 160 | 160 | 160 | 160 | 160 | 160 | 160 | 160 | 160 | 160 | 160 | 160 | 160 | 160 |
| 140 | 140 | 140 | 140 | 140 | 140 | 140 | 140 | 140 | 140 | 140 | 140 | 140 | 140 | 140 | 140 |
| 120 | 120 | 120 | 120 | 120 | 120 | 120 | 120 | 120 | 120 | 120 | 120 | 120 | 120 | 120 | 120 |
| 100 | 100 | 100 | 100 | 100 | 100 | 100 | 100 | 100 | 100 | 100 | 100 | 100 | 100 | 100 | 100 |
| 80 | 80 | 80 | 80 | 80 | 80 | 80 | 80 | 80 | 80 | 80 | 80 | 80 | 80 | 80 | 80 |
| 60 | 60 | 60 | 60 | 60 | 60 | 60 | 60 | 60 | 60 | 60 | 60 | 60 | 60 | 60 | 60 |
| 40 | 40 | 40 | 40 | 40 | 40 | 40 | 40 | 40 | 40 | 40 | 40 | 40 | 40 | 40 | 40 |
| 20 | 20 | 20 | 20 | 20 | 20 | 20 | 20 | 20 | 20 | 20 | 20 | 20 | 20 | 20 | 20 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

Image data ⎯⎯⎯⎯⎯→ Scanning direction

| Difference No. | 0 | 1 |
|---|---|---|
| Difference value | 0 | -20 |

FIG. 18B

| Reference color No. | 0 | 1 | 2 |
|---|---|---|---|
| Reference color pixel value | 240 | 0 | longitudinal |

| | | | | | | | | | | | | | | | | |
|---|---|---|---|---|---|---|---|---|---|---|---|---|---|---|---|---|
| | | | | | | | | Reference color No.+ difference No. | | | | | | | | |
| 0+0 | 0+0 | 0+0 | 0+0 | 0+0 | 0+0 | 0+0 | 0+0 | 0+0 | 0+0 | 0+0 | 0+0 | 0+0 | 0+0 | 0+0 | 0+0 | 0+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 2+1 | *+0 | *+0 | *+0 | *+0 | *+0 | *+0 | *+0 | *+0 | *+0 | *+0 | *+0 | *+0 | *+0 | *+0 | *+0 | *+0 |
| 1+0 | 1+0 | 1+0 | 1+0 | 1+0 | 1+0 | 1+0 | 1+0 | 1+0 | 1+0 | 1+0 | 1+0 | 1+0 | 1+0 | 1+0 | 1+0 | 1+0 |
| 1+0 | 1+0 | 1+0 | 1+0 | 1+0 | 1+0 | 1+0 | 1+0 | 1+0 | 1+0 | 1+0 | 1+0 | 1+0 | 1+0 | 1+0 | 1+0 | 1+0 |

Gradation ⎯⎯⎯⎯⎯→ Scanning direction

F I G. 19

F I G. 20

GRADATION IMAGE FORMING APPARATUS AND GRADATION IMAGE FORMING METHOD

CROSS-REFERENCE TO RELATED APPLICATIONS

This application is based upon and claims the benefit of priority from prior Japanese Patent Application No. 2003-427414, filed Dec. 24, 2003, the entire contents of which are incorporated herein by reference.

BACKGROUND OF THE INVENTION

1. Field of the Invention

The present invention relates to a gradation image forming apparatus and a gradation image forming method for forming gradation images.

2. Description of the Related Art

A gradation image is often used in an image of a small number of colors (data amount) such as image material or a Web banner in addition to full-color computer graphics. The use of the gradation image enables formation of a picturesque and more natural image even when the number of colors is small.

For formation of such a gradation image, for example, Jpn. Pat. Appln. KOKAI Publication No. 9-259258 presents a method of generating gradation data which has a one-dimensional inclination based on a start color of a gradation image, a unit width for changing a grayscale therein, and a grayscale change rate for each unit width. According to the method of Publication No. 9-259258, gradation data can be generated from the start color of the gradation image, the inclination thereof, and a step width. Thus, it is not necessary to store all data of pixel values of the gradation image in memory, and the volume of data can be reduced.

BRIEF SUMMARY OF THE INVENTION

According to a first aspect of the present invention, there is provided a gradation image forming apparatus comprising:
a gradation data generation section which generates gradation data in each pixel of a gradation image based on at least one table of a reference color number corresponding to a pixel value of a reference color which is a start color of the gradation image, at least one table of a difference number corresponding to a difference in pixel values between adjacent pixels in the gradation image, and a pixel value of each pixel of the gradation image.

According to a second aspect of the present invention, there is provided a gradation image forming apparatus comprising:
a gradation registration section which registers information regarding a grayscale change of a gradation image;
a difference table creation section which creates at least one table of a difference number corresponding to a difference in pixel values between adjacent pixels in the gradation image based on the information regarding the grayscale change of the gradation image;
a reference color table creation section which creates at least one table of a reference number corresponding to a pixel value of a reference color which is a start color of the gradation image;
a table memory section which stores the table of the difference number and the table of the reference color number; and
a gradation data generation section which generates gradation data in each pixel of the gradation image based on the table of the difference number and the table of the reference color number stored in the table memory section and a pixel value of each pixel of the gradation image.

According to a third aspect of the present invention, there is provided a gradation image forming method comprising:
registering information regarding a grayscale change of a gradation image;
creating at least one table of a difference number corresponding to a difference in pixel values between adjacent pixels in the gradation image based on the information regarding the grayscale change of the gradation image;
creating at least one table of a reference color number corresponding to a pixel value of a reference color number which is a start color of the gradation image; and
generating gradation data in each pixel of the gradation image based on the table of the difference number, the table of the reference color number and a pixel value of each pixel of the gradation image.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Next, the preferred embodiments of the present invention will be described with reference to the accompanying drawings.

FIRST EMBODIMENT

To begin with, a first embodiment of the present invention will be described. The first embodiment of the invention is an example of forming a gradation image whose grayscale changes in a scanning direction of image data. Hereinafter, the scanning direction will be referred to as the horizontal direction. This is because pixel scanning is executed in the horizontal direction of the image.

Figure 1:
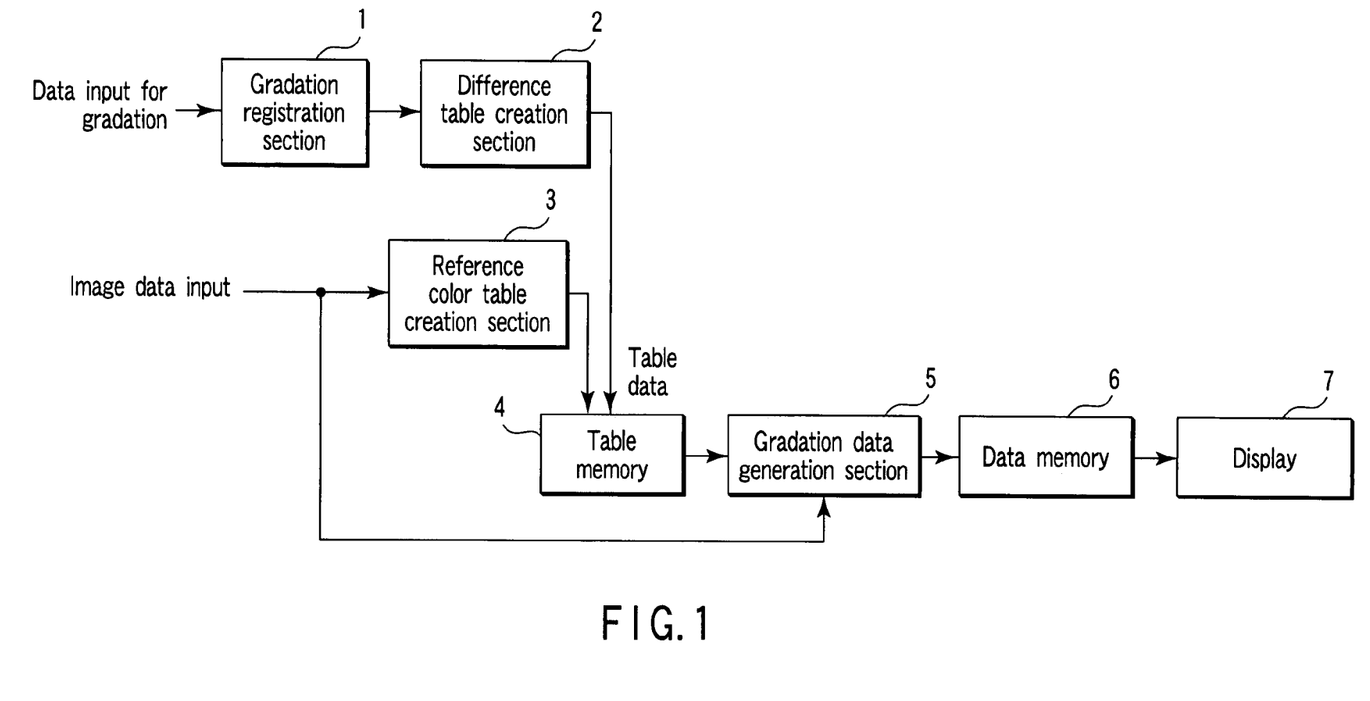
FIG. 1 is a block diagram showing a constitution of a gradation image forming apparatus according to a first embodiment of the present invention.

FIG. 1 is a block diagram showing a constitution of a gradation image forming apparatus according to the first embodiment of the invention. That is, the gradation image forming apparatus of the first embodiment comprises a gradation registration section 1, a difference table creation section 2, a reference color table creation section 3, a table memory 4, a gradation data generation section 5, a data memory 6, and a display 7.

According to the first embodiment, a pixel value of each pixel of a gradation image is treated as a combination of the following two data (gradation data, hereinafter):

(Reference color number)+(difference number)

Figure 2:
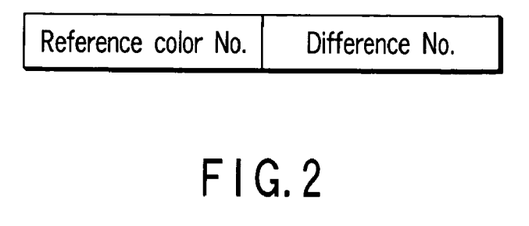
FIG. 2 is a view showing a data structure of gradation data.

The gradation data has a structure similar to that shown in FIG. 2. That is, the gradation data is an array of reference color number data and difference number data. A table of such reference color numbers (reference color table, hereinafter) and a table of such difference numbers (difference table, hereinafter) are registered as pattern data beforehand. Gradation data is generated based on the table data, whereby a gradation image is formed.

The reference color number is a numerical value allocated to correspond one-to-one to a pixel value of a reference color (start color of gradation image) of a gradation image. The difference number is a numerical value allocated to correspond one-to-one to a difference in pixel value from a pixel of a last column (simply referred to as adjacent pixel) in a scanning direction.

Figure 3:
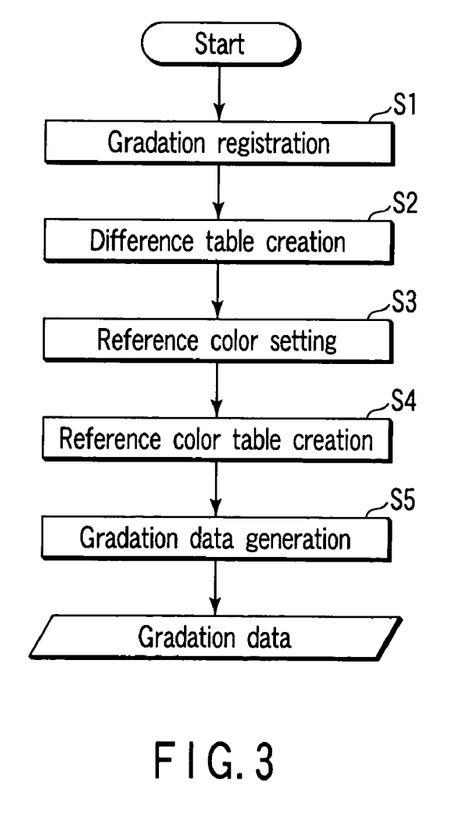
FIG. 3 is a flowchart showing a process of a gradation image forming method according to the first embodiment of the invention.

Hereinafter, a method of forming a gradation image which uses the gradation image forming apparatus will be described by referring to FIG. 3.

First, at the gradation registration section 1, gradation registration is executed (step S1). Here, the gradation registration means registration of data regarding a grayscale change of a gradation image input by a user or the like. The data regarding the grayscale change of the gradation image may be, e.g., data obtained by scanning the gradation image input by the user or the like, or function data indicating the grayscale change of the gradation image. As the function data, for example, a user-defined optional function such as a linear function (grayscale monotonously changes) or a tertiary function (grayscale change increases/decreases) similar to that shown in FIG. 4 can be used.

The gradation registration section 1 outputs the registered function data to the difference table creation section 2. The difference table creation section 2 creates a difference table similar to that shown in FIG. 5 or 6 based on the input function data (step S2).

Figure 5:
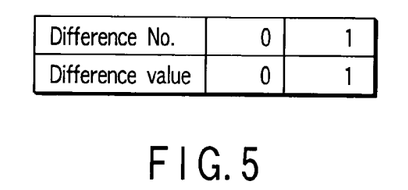
FIG. 5 is a view showing an example of a difference table of a linear function type.

For example, if the registered function data is a linear function, a difference between the adjacent pixels becomes inclination itself of the liner function. Assuming that a difference is equal to one pixel value, a difference table is created as shown in FIG. 5. In other words, "0" of a difference number is allocated to a difference 0, and "1" of a difference number is allocated to a difference 1. Incidentally, 0 is included in the difference table for the purpose of designating an end position of the gradation image. Additionally, the difference numbers shown in FIG. 5 may be allocated in reverse sequence.

Figure 4:
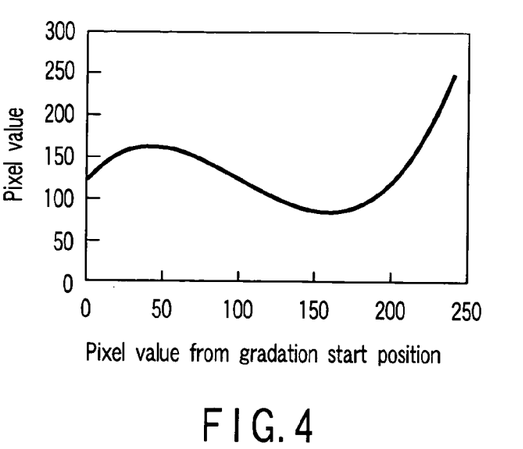
FIG. 4 is a view showing an example of a function registered by gradation registration.
Figure 6:
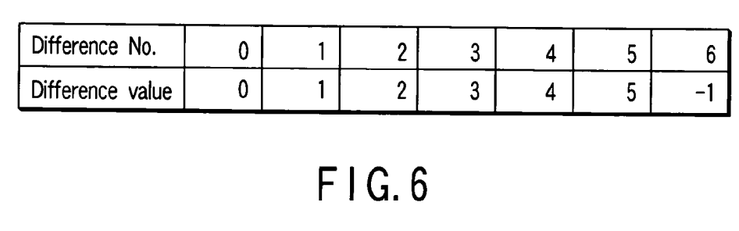
FIG. 6 is a view showing an example of a difference table of a tertiary function type.

If the registered function data is a tertiary function similar to that shown in FIG. 4, and differences between all the adjacent pixels of FIG. 4 can be represented by seven numerical values of {−1, 0, 1, 2, 3, 4, and 5}, a difference table can be created as shown in FIG. 6 based on the same idea as that of the linear function.

The difference table can be created for each of three components of RGB. However, if color differentiation is eliminated and a grayscale difference only is taken into consideration, the number of necessary difference tables is only one. Thus, it is possible to prevent an increase in pattern data caused by overlapping of difference numbers.

Image data for forming the gradation data is input to the reference color table creation section 3 by the user or the like. Next, a reference color is set from the input image data (step S3). The reference color is preferably a pixel value of a pixel from which scanning is started. Needless to say, the reference color may be optionally set by user operation or the like. The image data is also input to the gradation data generation section 5.

Figure 7:
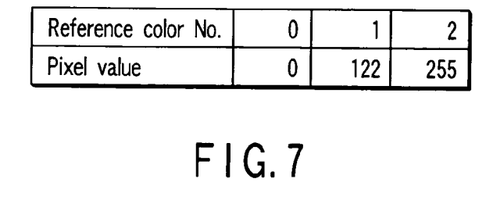
FIG. 7 is a view showing an example of a reference color table.

After the setting of the reference color, the reference color table creation section 3 creates a reference color table similar to that shown in FIG. 7 (step S4). For example, in the case of allocating reference color numbers to reference colors of (R, G, B)=(255, 122, 0), RGB differentiation is eliminated, and simply three grayscales are used as references. In other words, a reference color number "0" is allocated to a pixel value 0, a reference color number "1" is allocated to a pixel value 122, and a reference color number "2" is allocated to a pixel value 255. Thus, by eliminating RGB differentiation, and creating the reference color table so that a plurality of color components can be dealt with by one reference color table, it is possible to reduce the number of reference color tables.

Next, the difference table and the reference color table created in the aforementioned manner are stored in the table memory 4. The gradation data generation section 5 generates gradation data based on the difference table and the reference color table stored in the table memory 4 and the image data input by the user or the like (step S5), and stores the generated gradation data in the data memory 6. Based on the stored gradation data, a gradation image can lastly be displayed on a predetermined display 7 such as an LCD monitor or the like.

Figure 8:
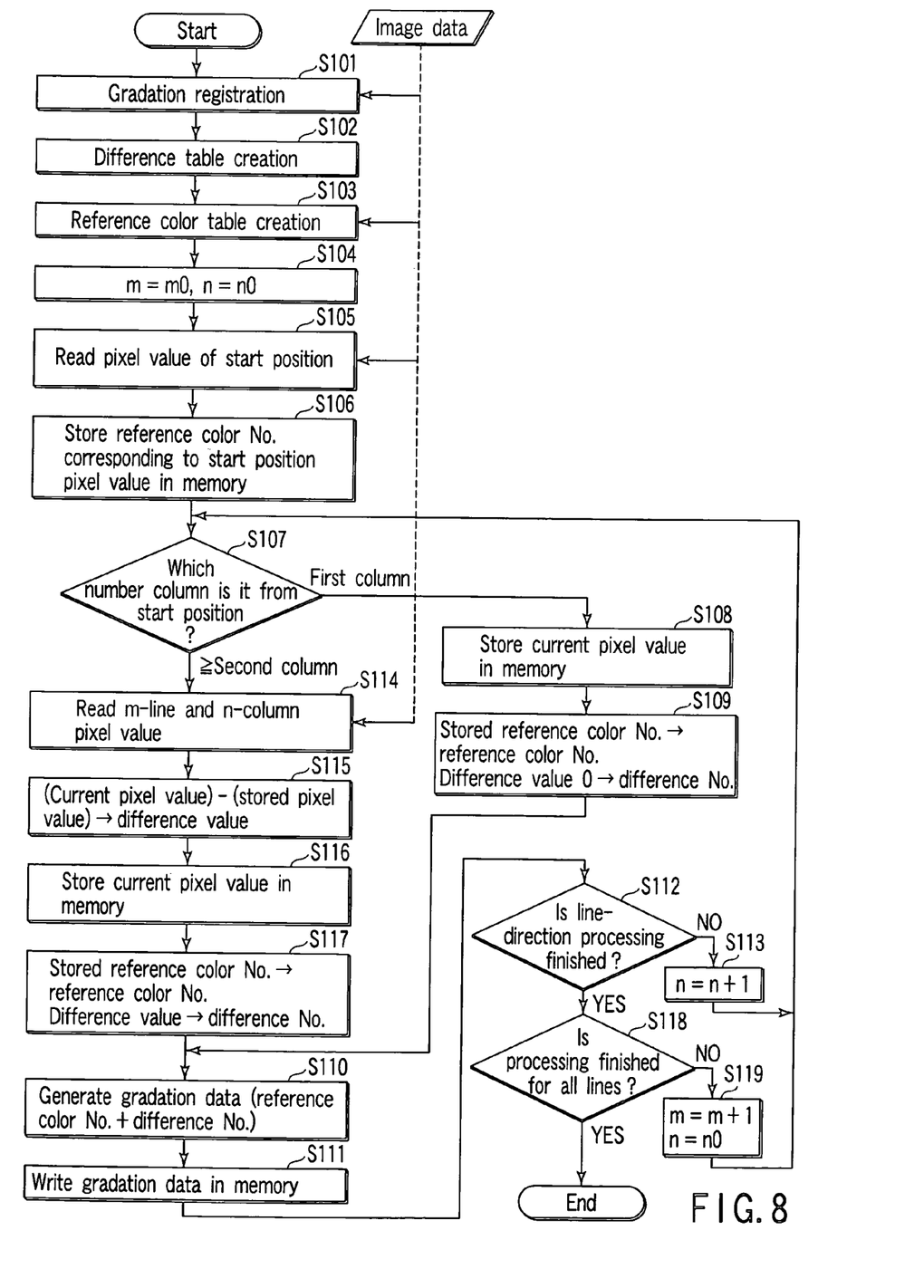
FIG. 8 is a flowchart explaining the gradation image forming method of the first embodiment more specifically.
Figure 9A:
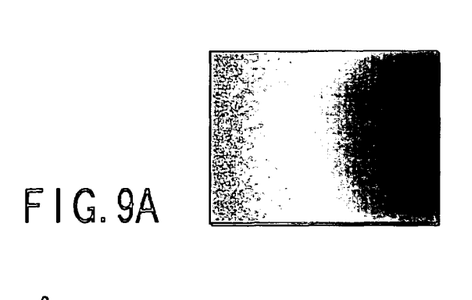
FIG. 9A is a view showing an example of a gradation image formed in a specific example of the first embodiment.
Figure 9B:
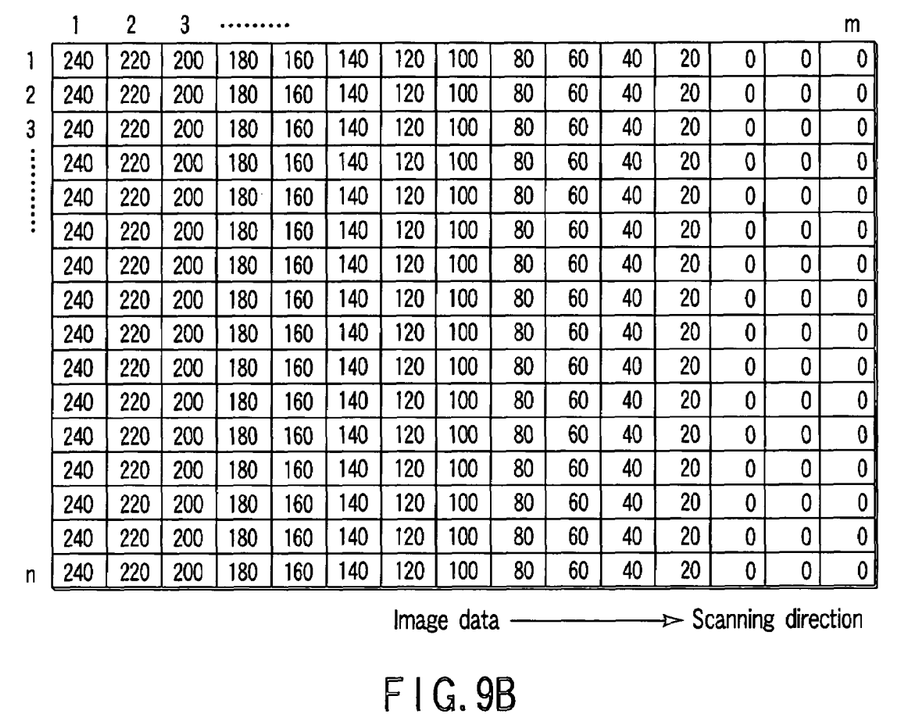
FIG. 9B is a view showing image data input the specific example of the first embodiment.

A method of forming such a horizontal-direction gradation image will be described more specifically by referring to a flowchart of FIG. 8. Here, for example, consideration will be given to a case of forming a gradation image similar to that shown in FIG. 9A. Image data input by the user or the like in this case is shown in FIG. 9B. In the example, registered function data is a linear function.

Figure 10A:
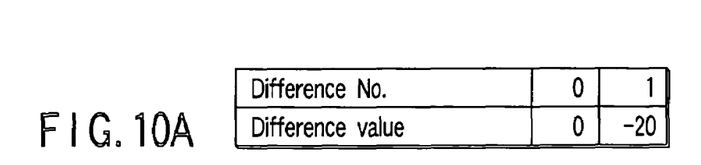
FIG. 10A is a view showing a difference table created in the specific example of the first embodiment.
Figure 10B:
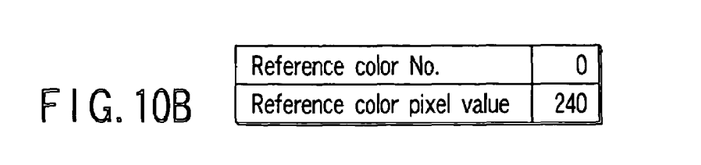
FIG. 10B is a view showing a reference color table created in the specific example of the first embodiment.

First, at the gradation registration section 1, the function data input by the user or the like is registered (step S101). Needless to say, the gradation registration may be executed by scanning the data input by the user or the like. Next, the difference table creation section 2 creates a difference table similar to that shown in FIG. 10A (step S102). The reference color table creation section 3 creates a reference color table similar to that shown in FIG. 10B based on the image data or the like input by the user or the like (step S103).

Subsequently, the user or the like designates a coordinate (m, n)=(m0, n0) of a gradation start pixel (step S104). After the designation of the start pixel by the user or the like, the gradation data generation section 5 reads a pixel value of the pixel of the start position (step S105). In the example of FIG. 9B, for example, when the start pixel is designated to be a first-line and first-column pixel, a pixel value 240 is read. Subsequently, the gradation data generation section 5 stores a reference color number corresponding to the read pixel value in the data memory 6 (step S106). Here, a reference color number 0 is stored.

Next, the gradation data generation section 5 determines which number column from a start pixel a read pixel belongs to (step S107). In the case of a first column, branching from step S107 to step S108, a pixel value 240 read in step S105 is stored in the data memory 6 (step S108). Next, a reference color number 0 corresponding to the pixel value 240 is set as a first-line and first-column reference color number, and a difference number is set to 0 (step S109). The difference number is 0, i.e., a difference is 0, because it is in the first column.

Next, the gradation data generation section 5 generates gradation data (step S110). In the example, gradation data of the start pixel is that a reference color number is 0 and a difference number is 0. Thus, according to the definition, the gradation data of the start pixel becomes 0 (reference color number)+0 (difference number). In other words, data of the pixel value 240 can be described by 2-bit data. After the generation of the gradation data, the gradation data generation section 5 stores the gradation data in the data memory 6 (step S111).

Next, the gradation data generation section 5 determines whether processing has been finished or not in all line directions (step S112). If it is determined that the processing has not been finished in all the line directions, the process branches to step S113. Then, n=n+1 is set to execute reading of a pixel value of a pixel of a next column (step S113). Subsequently, returning to step S107, determination is made again as to which number pixel from the start pixel the read pixel belongs to. Since it is in the second column, the determination of step S107 is branched to step S114. The gradation data generation section 5 reads a pixel value of a pixel of a next column (step S114). In the example, a pixel value 220 of a first-line and second-column pixel is read. Next, the gradation data generation section 5 takes a difference between a pixel value of a current pixel and a pixel value of a pixel of a last column (step S115). In the example, a difference is between the pixel value 220 of the first-line and second-column pixel and the pixel value 240 of the first-line and first-column pixel, i.e., −20. Subsequently, the pixel value 220 read in step S114 is stored in the data memory 6 (step S116).

Next, the reference color number stored in step S106 is set as a reference color number of the pixel read in step S114, and the difference number is set as a difference number corresponding to the value obtained in step S115 (step S117). Then, the process moves to step S110. For example, the first-line and second-column gradation data becomes 0+1 in which 0 is a reference color number and 1 is a difference number. Incidentally, the reference color number is 0 because the pixel is a first line pixel.

The processing is thus executed, and when the processing is finished for all in the line direction, the determination of step S112 is branched to step S118. Then, the gradation data generation section 5 determines whether processing has been finished or not for all the lines (step S118). Here, since it is in the first line, the process is branched to step S119. The gradation data generation section 5 sets m=m+1 and n=n0 (step S119), and reads a pixel value of a next-line and n0 column pixel (first column in the example). Thereafter, a similar operation will be repeated.

Figure 11:
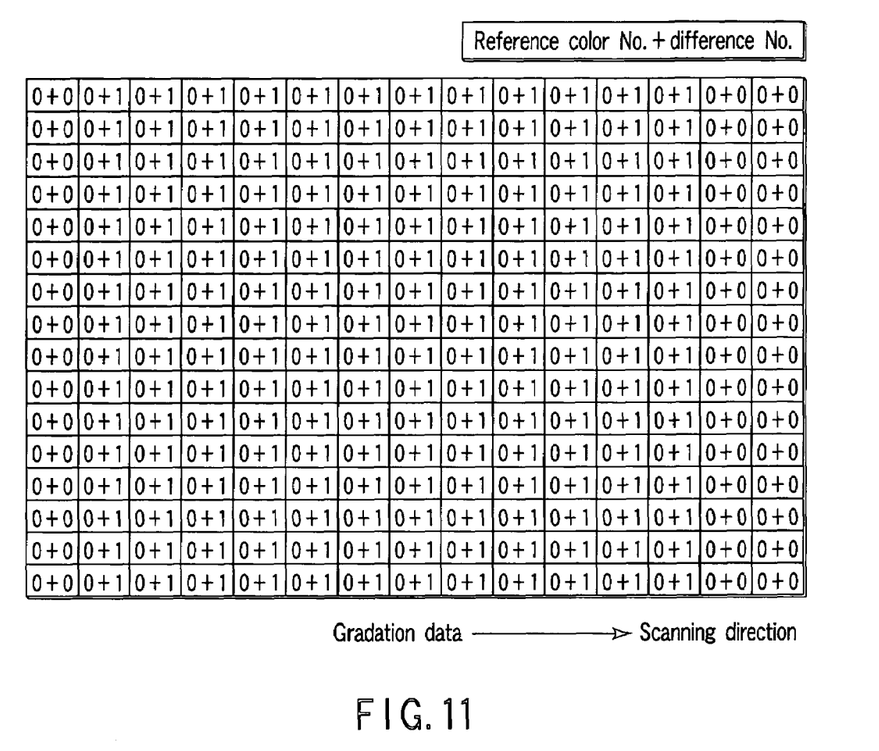
FIG. 11 is a view showing gradation data generated in the specific example of the first embodiment.
Figure 20:
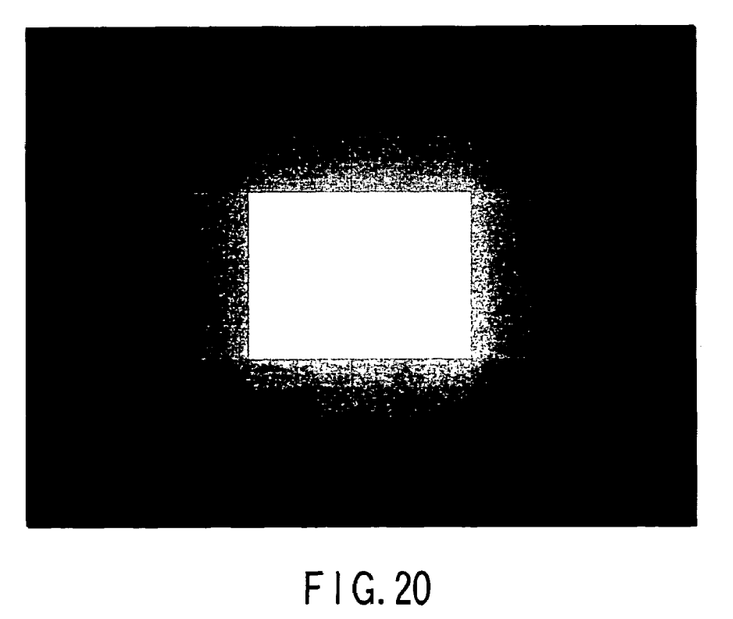
FIG. 20 is a view showing an example of an image formed by using the gradation image forming apparatus of the invention.

When the processing has been finished for all the lines, the gradation image forming process is finished. As a result, gradation data is generated as shown in FIG. 11. Incidentally, a gradation image similar to that shown in FIG. 20 can be formed by using the method of the first embodiment.

Figure 12A:
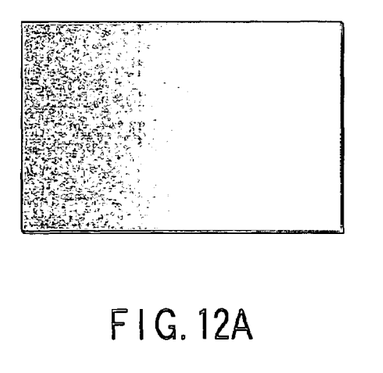
FIGS. 12A and 12B are views showing examples of different gradation images formed on the same difference table.
Figure 12B:
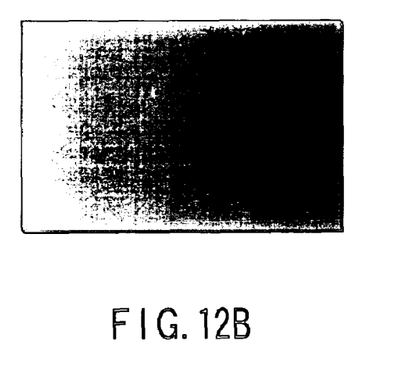
Figure 13A:
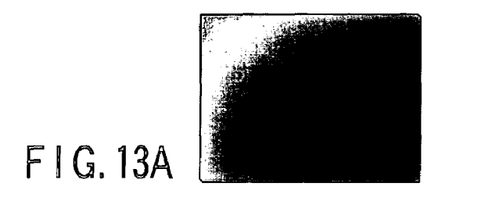
FIG. 13A is a view showing an example of an oblique gradation image.
Figure 13B:
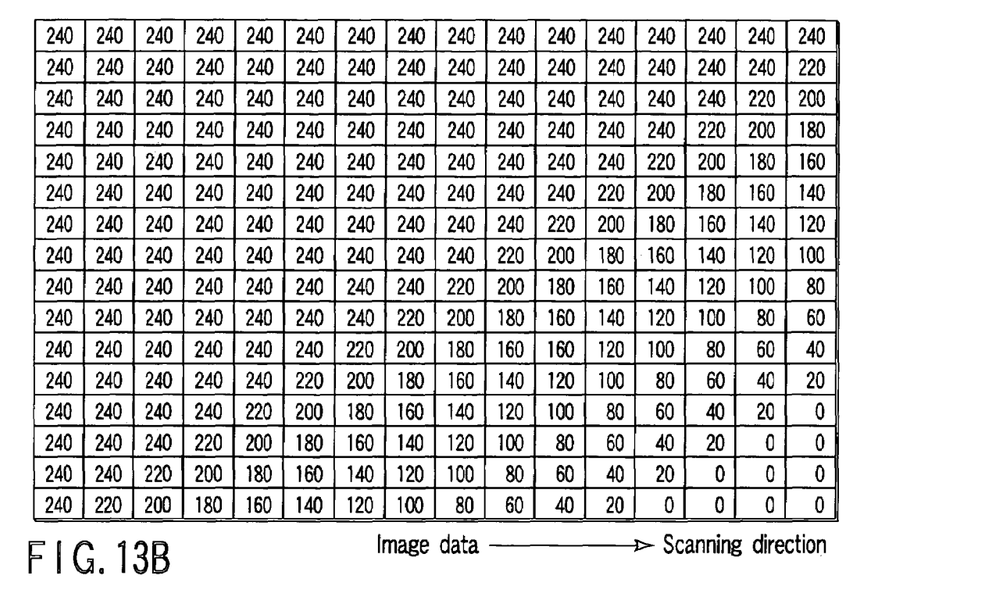
FIG. 13B is a view showing image data input during formation of the oblique gradation image of FIG. 13A.
Figure 13C:
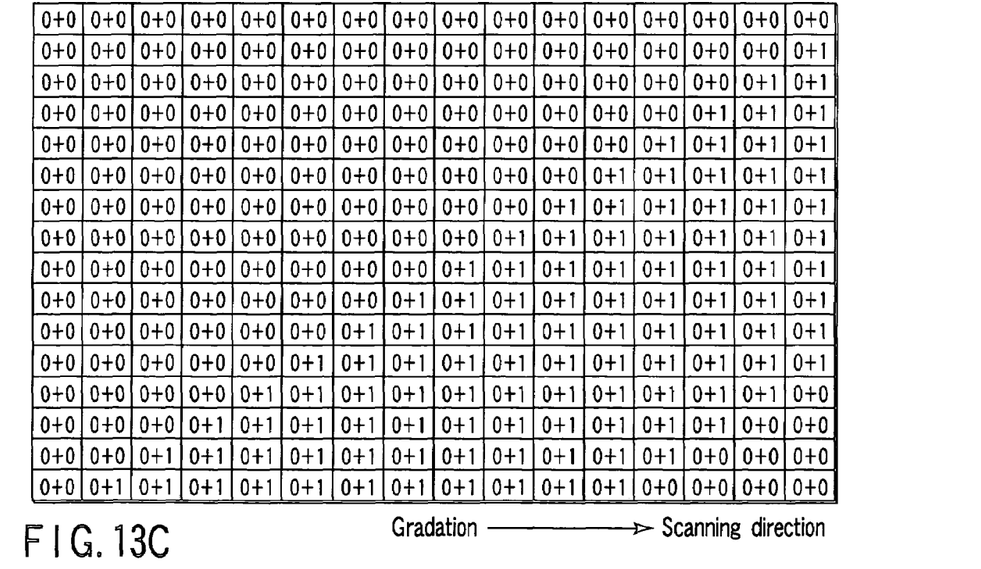
FIG. 13C is a view showing gradation data generated during the formation of the oblique gradation image of FIG. 13A.

As described above, according to the first embodiment, a data amount can be reduced by representing a pixel value of each pixel in the gradation image by a set of a reference color number and a difference number. By always taking a difference between adjacent pixels, it is possible to deal with images in addition to the gradation image which makes linear functional changes. According to the first embodiment, gradation images whose grayscale changes are similar can be represented only by changing reference color numbers, for example, as shown in FIG. 12A, 12B. Furthermore, by using the method of the first embodiment, it is possible to form a gradation image whose grayscale change in an oblique direction shown in FIG. 13A. In this case, by inputting image data similar to that shown in FIG. 13B, gradation data shown in FIG. 13C can be generated.

SECOND EMBODIMENT

Next, a second embodiment of the present invention will be described. The second embodiment is an example of forming a gradation image whose grayscale changes in a direction orthogonal to a scanning direction of image data. Hereinafter, the direction orthogonal to the scanning direction will be referred to as a longitudinal direction.

Figure 14:
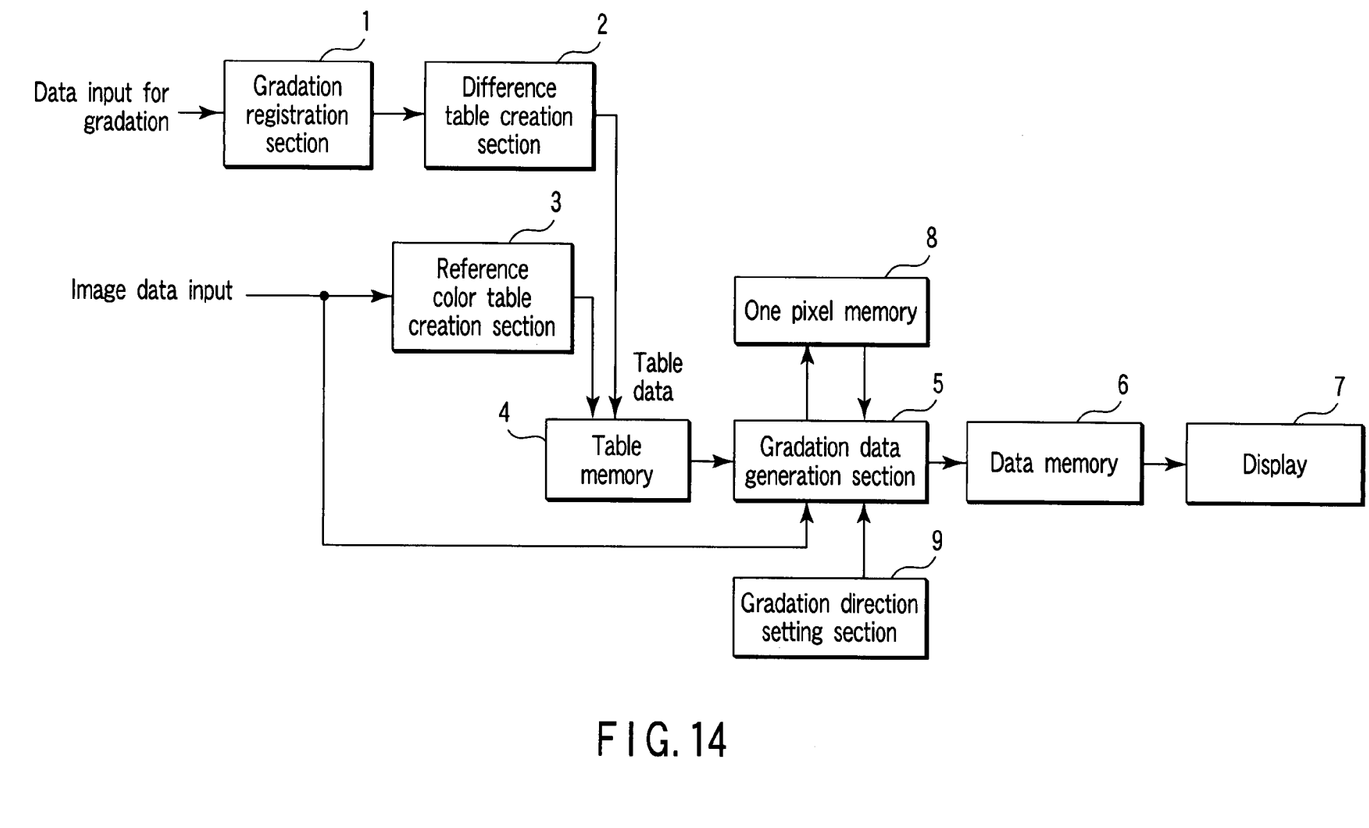
FIG. 14 is a block diagram showing a constitution of a gradation image forming apparatus according to a second embodiment of the invention.

FIG. 14 is a block diagram showing a constitution of a gradation image forming apparatus according to the second embodiment of the invention. That is, the gradation image forming apparatus of the second embodiment comprises a one-pixel memory 8 and a gradation direction setting section 9 in addition to the components of the constitution of FIG. 1. The one-pixel memory 8 stores a pixel value of one pixel amount. In other words, since no pixel scanning is executed in the longitudinal direction, such a memory is needed to take a difference regarding longitudinal-direction pixels. The gradation direction setting section 9 sets presence of a longitudinal direction in a grayscale changing direction of a gradation image.

According to the second embodiment, a value indicating presence of longitudinal-direction gradation is included in values set in a reference color table.

Figure 15:
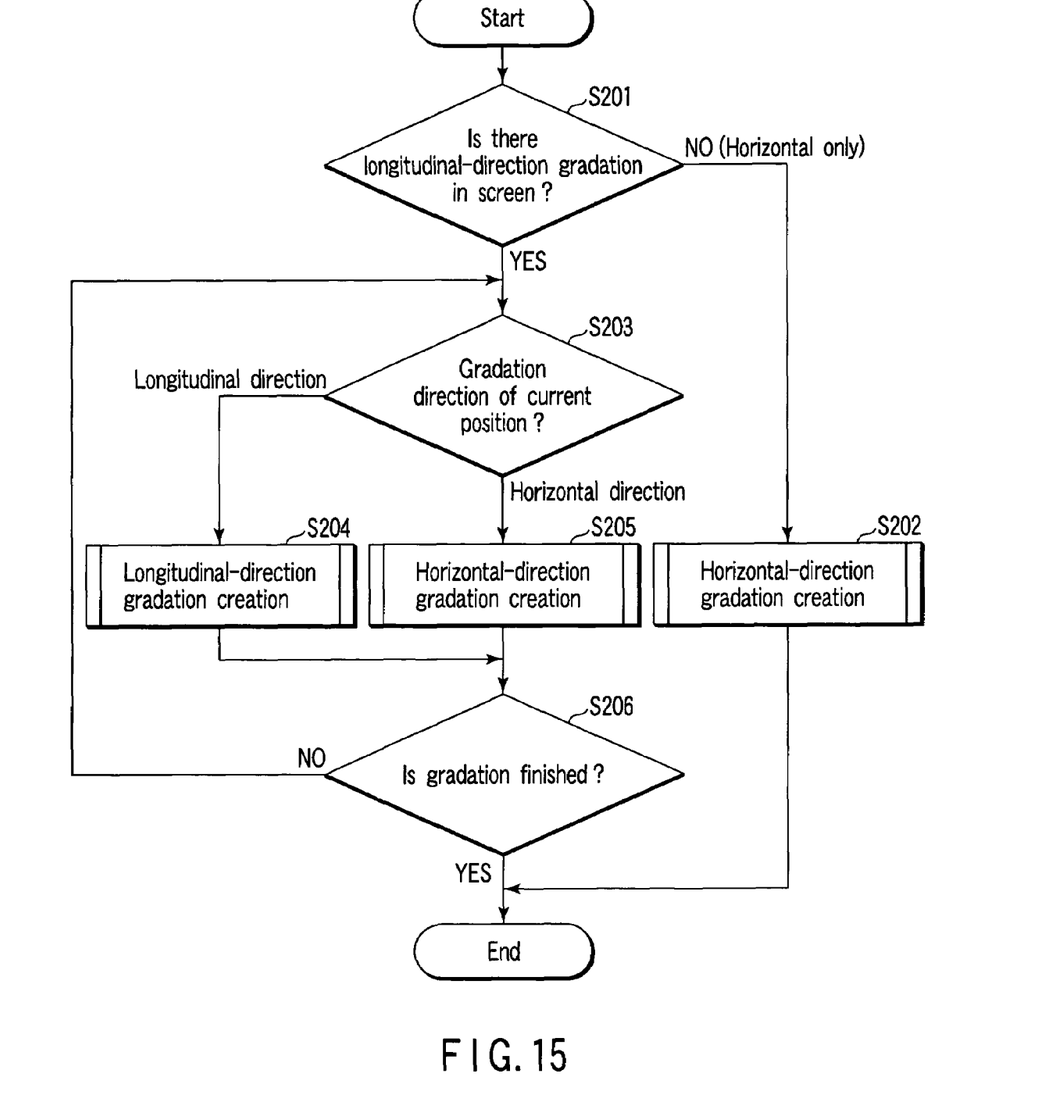
FIG. 15 is a flowchart showing a main process of a gradation image forming method according to the second embodiment of the invention.

Hereinafter, a method of forming a gradation image which uses such a gradation image forming apparatus will be described. FIG. 15 is a main flowchart of the gradation image forming method when longitudinal-direction gradation is included.

First, determination is made as to whether there is longitudinal-direction gradation or not in image data input by a user or the like (step S201). If it is determined that there is no longitudinal-direction gradation, the process is branched from step S201 to step S202, and moves to the flowchart of the horizontal-direction gradation image formation of the first embodiment (step S202). Then, after generation of gradation data, the process is finished.

On the other hand, if it is determined in step S201 that there is longitudinal-direction gradation, determination is made as to which gradation direction of a current position is in, longitudinal or horizontal (step S203). If the determination shows that the gradation direction of the current position is longitudinal, the process moves to a later-described flowchart of longitudinal-direction gradation image formation (step S204). On the other hand, if the gradation direction of the current position is horizontal, the process moves to the flowchart of horizontal-direction gradation image formation (step S205).

After the end of the operation of step S204 or step S205, determination is made as whether processing has been finished or not for all lines (step S206). If the determination shows that the processing has not been finished for all the lines, the process returns to step S203. On the other hand, the determination shows that the processing has been finished for all the lines, the process is finished.

Figure 16:
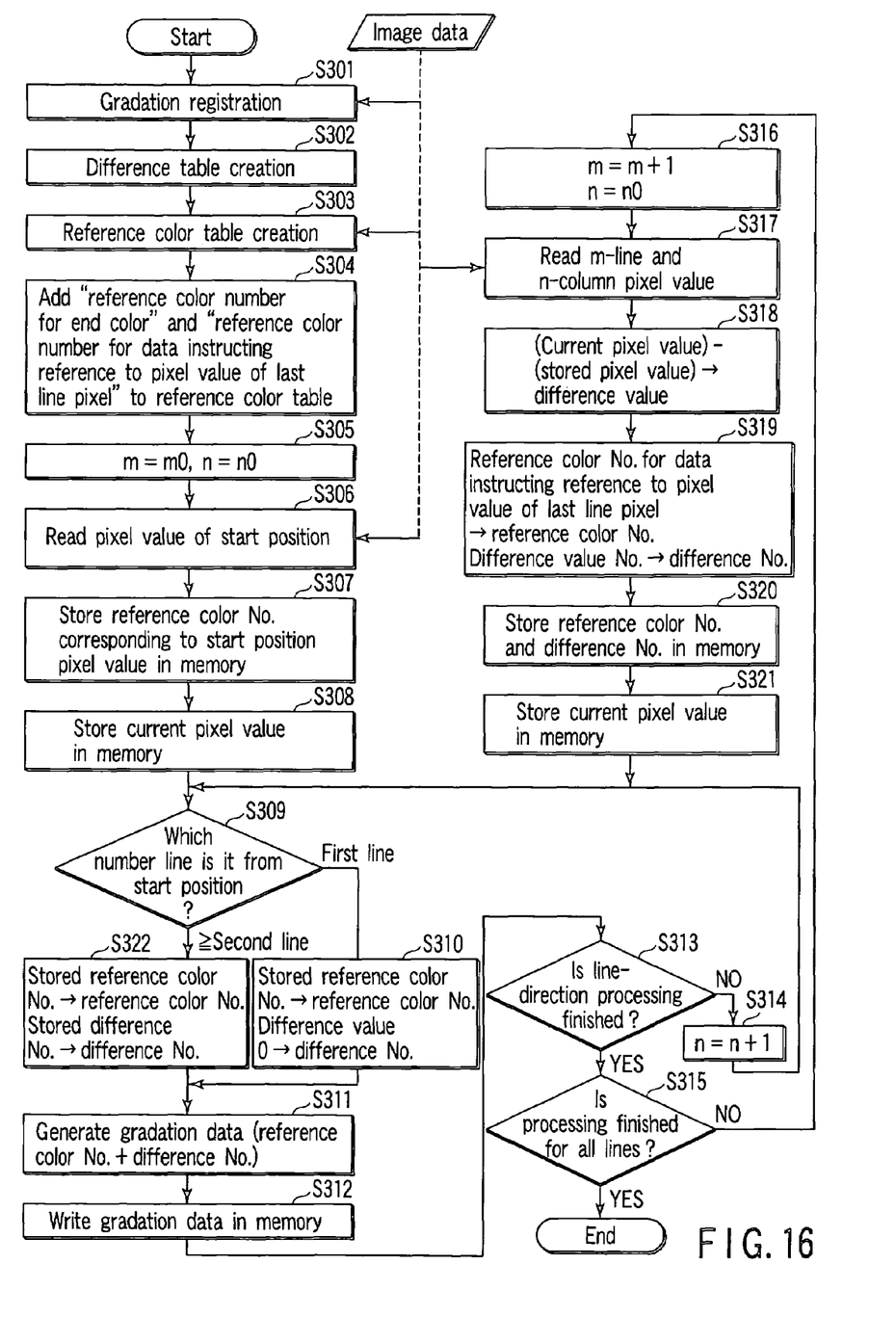
FIG. 16 is a flowchart specifically explaining a method of forming a longitudinal-direction gradation image.
Figure 17A:
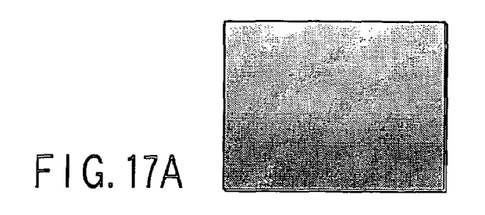
FIG. 17A is a view showing an example of a gradation image formed in a specific example of the second embodiment.
Figure 17B:
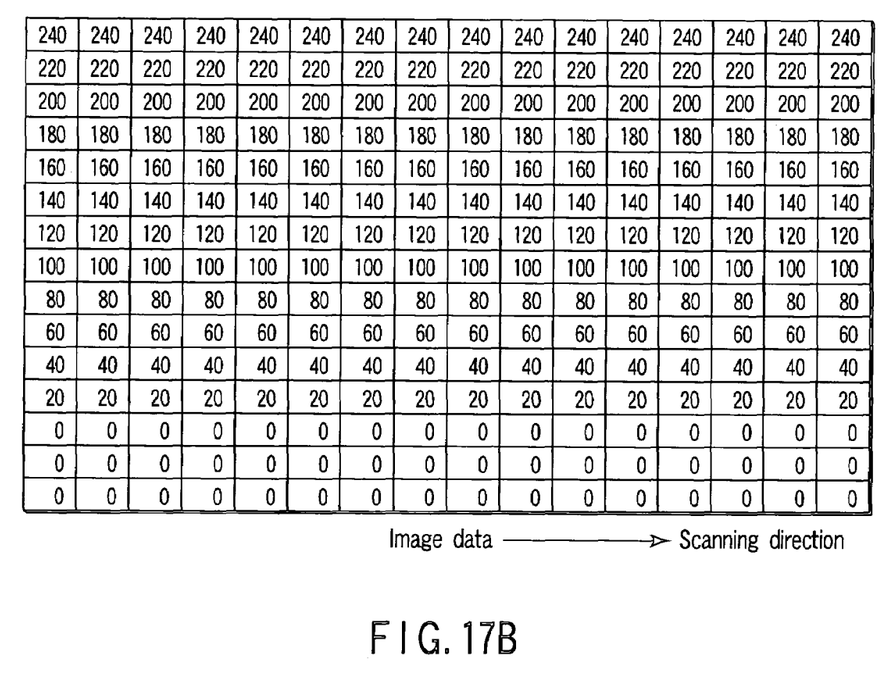
FIG. 17B is a view showing image data input in the specific example of the second embodiment.

Next, the flowchart of the longitudinal-direction gradation image formation of step S204 will be described by referring to FIG. 16. Here, for example, consideration will be given to a case of forming a gradation image similar to that shown in FIG. 17A. Image data input by a user or the like in this case is shown in FIG. 17B. Registered function data is a linear function.

Figure 18A:
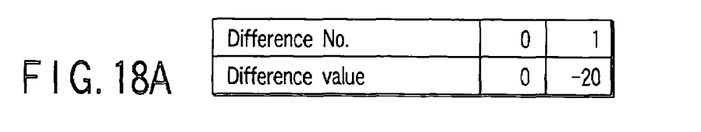
FIG. 18A is a view showing a difference table created in the specific example of the second embodiment.

First, at a gradation registration section 1, data obtained by scanning the gradation image input by the user or the like or function data input by the user or the like is registered (step S301). Next, a difference table creation section 2 creates a difference table similar to that shown in FIG. 18A (step S302). A reference color table creation section 3 creates a reference color table similar to that of the first embodiment shown in FIG. 10B based on the image data or the like input by the user or the like (step S303). The process thus far is similar to that of the first embodiment.

Figure 18B:
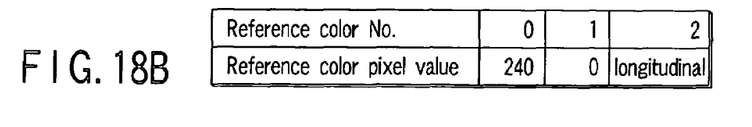
FIG. 18B is a view showing a reference color table created in the specific example of the second embodiment.

Next, the reference color table creation section 3 adds a reference color number corresponding to a gradation end color and a reference color number instructing reference to a pixel value of a last line pixel to the created reference color table (step S304). Thus, a reference color number used in the second embodiment becomes similar to that shown in FIG. 18B.

Subsequently, the user or the like designates a coordinate (m, n)=(m0, n0) of a gradation start pixel (step S305). After the designation of the start pixel by the user or the like, a gradation data generation section 5 reads a pixel value of a pixel of a start position (step S306). In the example of FIG. 17B, for example, a pixel value 240 is read when the start pixel is designated to be a first-line and first-column pixel. Subsequently, the gradation data generation section 5 stores a reference color number corresponding to the read pixel value in a data memory 6 (step S307). Here, a reference color number 0 is stored. Further, the read pixel value is stored in the one-pixel memory 8 (step S308). Accordingly, a difference can be taken from the pixel value of the last line pixel.

Next, the gradation data generation section 5 determines which number line from the start pixel the read pixel belongs to (step S309). In the case of a first line, branching from step S309 to step S310, the reference color number 0 stored in step S307 is set as a first-line and first-column reference color number, and a difference number is set to 0 (step S310).

Next, the gradation data generation section 5 generates gradation data (step S311). In the example, 0+0 is set. After the generation of the gradation data, the gradation data generation section 5 stores the generated gradation data in the data memory 6 (step S312).

Figure 19:
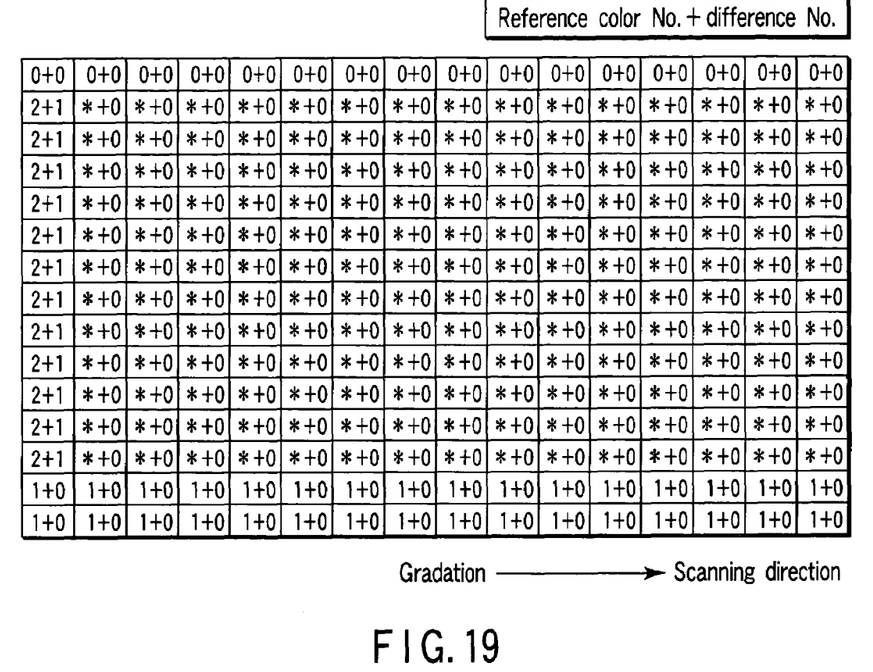
FIG. 19 is a view showing gradation data created in the specific example of the second embodiment.

Next, the gradation data generation section 5 determines whether processing has been finished or not for all in a line direction (step S313). If it is determined that the processing has not been finished for all in the line direction, the process branches to step S314. Then, n=n+1 is set to execute reading of a pixel value of a pixel of a next column (step S314). Subsequently, the process returns to step S309. Thereafter, the operation from step S310 to step S314 is repeated until gradation data of all columns of the first line are generated. Here, as shown in FIG. 19, the same gradation data is generated for the same line.

On the other hand, if it is determined in step S313 that the processing is finished for all in the line direction, the determination of step S313 is branched to step S315. Then, the gradation data generation section 5 determines whether processing has been finished or not for all the lines (step S315). If the determination shows that the processing has not been finished for all the lines, the process moves to step S316. The gradation data generation section 5 sets m=m+1 and n=n0 (step S316), and reads a pixel value of a next-line and n0 column pixel (first column in the example) (step S317). In the example, a pixel value 220 of a second-line and first-column pixel is read. Next, the gradation data generation section 5 takes a difference between a pixel value of a current pixel and the pixel value of the last line pixel stored in the one-pixel memory 8 (step S318). In the example, a difference is between the pixel value 220 of the second-line and first-column pixel and the pixel value 240 of the first-line and first-column pixel, i.e., −20. Next, a reference color number to instruct reference to the pixel value of the last line pixel is set as a reference color number of the pixel read in step S317, and a difference number is set as a difference number corresponding to the value obtained in step S318 (step S319). Subsequently, the reference color number and the difference number are stored in the data memory 6 (step S320). Further, the pixel value of the pixel read in step S317 is stored in the one-pixel memory 8 (step S321).

Subsequently, returning to step S309, the determination thereof is branched to step S322. Then, the reference color number and the difference number stored in step S320 are set as a reference color number and a difference number of a pixel of the same line as that of the pixel read in step S317 (step S322). Then, moving to step S311, gradation data is generated. In the example, 2+1 is set.

Since the same reference color number as that of the m0 column is used for pixels of subsequent columns, the reference color number of the pixels after the m0 column may be omitted. In FIG. 19, this is represented by "*". However, in this case, a reference color number corresponding to a gradation end color similar to that of the second embodiment must be added. In the case of finishing gradation, the reference color number of the end color is set as a pixel reference color number.

When the processing has been finished for all the lines, the gradation image forming process is finished.

Another example of a method of forming a longitudinal-direction gradation image will be briefly described. That is, in the example, gradation data of the longitudinal-direction second column and after is generated as a difference from the pixel value of the previous line and last column pixel. For example, in the foregoing, the gradation data of the second line and first column of FIG. 18B becomes 2+1. However, this may be considered as a difference from the pixel value of the pixel of the first line and last column pixel to be replaced by 0+1. In this case, since the longitudinal-direction gradation can be considered similar to the horizontal-direction gradation, the one-pixel memory 8 or the reference color number for instructing reference to the pixel value of the last line pixel is made unnecessary. However, resistance to errors becomes low since the longitudinal-direction pixel is not directly read.

As described above, according to the second embodiment, a data amount can be reduced for a longitudinal-direction gradation image orthogonal to the scanning direction of the pixel.

The present invention has been described by way of embodiments. However, the invention is not limited to the embodiments. Needless to say, various changes and applications can be made within the teachings of the invention. For example, the horizontal-direction gradation image of the first embodiment and the longitudinal-direction gradation image of the second embodiment can be used in combination. Furthermore, the reference color number and the difference number have been given for each pixel. However, the image can be formed by a smaller data amount based on run-length data. The first and second embodiments separately show the table memory 4, the data memory 6 and the one-pixel memory 8. Needless to say, however, these components may be integrated in one memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A gradation image forming apparatus comprising:
a gradation data generation section which generates gradation data in each pixel of a gradation image based on a reference color table including at least one reference color number corresponding to a pixel value of a reference color which is a start color of the gradation image, a difference table including at least two difference numbers corresponding to differences in pixel values between adjacent pixels in the gradation image, and a pixel value of each pixel of the gradation image.

2. The apparatus according to claim 1, wherein the gradation data is constituted as data in which the reference color number and the difference color numbers are arrayed.

3. The apparatus according to claim 1, wherein the table of the reference color number includes a table of reference color numbers corresponding to a plurality of color components.

4. The apparatus according to claim 1, further comprising a gradation display section which displays the gradation image based on the gradation data generated by the gradation data generation section.

5. A gradation image forming apparatus comprising:
a gradation registration section which registers information regarding a grayscale change of a gradation image;
a difference table creation section which creates a difference table including at least two difference numbers corresponding to differences in pixel values between adjacent pixels in the gradation image based on the information regarding the grayscale change of the gradation image;
a reference color table creation section which creates a reference color table including at least one reference color number corresponding to a pixel value of a reference color which is a start color of the gradation image;
a table memory section which stores the table of the difference numbers and the table of the reference color number; and
a gradation data generation section which generates gradation data in each pixel of the gradation image based on the table of the difference numbers and the table of the reference color number stored in the table memory section and a pixel value of each pixel of the gradation image.

6. The apparatus according to claim 5, wherein the reference color table creation section creates a table of reference color numbers corresponding to a plurality of color components.

7. The apparatus according to claim 5, wherein the gradation data is constituted as data in which the reference color number and the difference color numbers are arrayed.

8. The apparatus according to claim 5, further comprising a gradation display section. which displays the gradation image based on the gradation data generated by the gradation data generation section.

9. The apparatus according to claim 5, further comprising:
a gradation direction setting section which sets a grayscale changing direction of the gradation image in a direction orthogonal to a scanning direction of the pixel of the gradation image; and
a one-pixel memory section which stores a pixel value of a start position of a last line of the gradation image,
wherein when the grayscale changing direction of the gradation image is set in the direction orthogonal to the scanning direction of the pixel of the gradation image by the gradation direction setting section, the gradation data generation section instructs the reference color table creation section to add a reference color number to instruct reference to the pixel value of the start position of the last line stored in the one-pixel memory section and a reference color number corresponding to a pixel value of an end color to the reference color table, and takes into consideration the pixel value of the start position of the last line to generate the gradation data during the generation of the gradation data.

10. A gradation image forming method comprising:
registering, using a gradation registration section, information regarding a grayscale change of a gradation image;
creating, using a difference table creation section, a difference table including at least two difference numbers corresponding to differences in pixel values between adjacent pixels in the gradation image based on the information regarding the grayscale change of the gradation image;

creating, using a reference color table creation section, a reference color table including at least one reference color number corresponding to a pixel value of a reference color number which is a start color of the gradation image; and generating, using a gradation data generation section, gradation data in each pixel of the gradation image based on the table of the difference numbers, the table of the reference color number and a pixel value of each pixel of the gradation image.

11. The method according to claim 10, further comprising:

setting a grayscale changing direction of the gradation image in a direction orthogonal to a scanning direction of the pixel of the gradation image, wherein when the grayscale changing direction of the gradation image is set in the direction orthogonal to the scanning direction of the pixel of the gradation image, a pixel value of a start position of a last line of each line is taken into consideration to generate the gradation data during the generation of the gradation data of each pixel.

* * * * *